Oct. 10, 1939.  N. HIRSCH  2,175,990
PROCESS AND ARRANGEMENT FOR INCREASING THE
MAXIMUM OUTPUT OF ELECTRON TUBES
Filed Dec. 28, 1934  6 Sheets-Sheet 1

Oct. 10, 1939.  N. HIRSCH  2,175,990
PROCESS AND ARRANGEMENT FOR INCREASING THE
MAXIMUM OUTPUT OF ELECTRON TUBES
Filed Dec. 28, 1934   6 Sheets-Sheet 2

Witnesses:

Inventor:
Nicholas Hirsch

Oct. 10, 1939.     N. HIRSCH     2,175,990
PROCESS AND ARRANGEMENT FOR INCREASING THE
MAXIMUM OUTPUT OF ELECTRON TUBES
Filed Dec. 28, 1934     6 Sheets-Sheet 3

Witnesses:

Inventor:
Nicholas Hirsch

Patented Oct. 10, 1939

2,175,990

UNITED STATES PATENT OFFICE 2,175,990

PROCESS AND ARRANGEMENT FOR INCREASING THE MAXIMUM OUTPUT OF ELECTRON TUBES

Nicholas Hirsch, Budapest, Hungary

Application December 28, 1934, Serial No. 759,476
In Austria December 28, 1933

3 Claims. (Cl. 179—171)

The maximum alternating-current output, of which an amplifier tube is capable, is determined by its anode dissipation. Anode dissipation being limited by the permissible temperature rise of the anode, it is possible to increase the maximum alternating current output of amplifier tubes of varying load by suiting the anode dissipation existing at any moment to the load existing at that moment.

Arrangements have already become known, which with substantially constant anode voltage, render possible an increase of the negative grid voltage and thereby a diminution of the instantaneous value of the rest current, with decreasing alternating current output. These arrangements, however, are saddled with the drawback that the constant anode voltage has to be dimensioned for the maximum output for the whole range of work, the anode voltage really available being, owing to the unavoidable voltage drop, lower for the high outputs than for the low outputs. Accordingly, only an insignificant improvement of the average efficiency of the tubes is obtained. The anodes have to be dimensioned for the maximum output, as the amplifier tubes may, owing to willful acts or to disturbances, have to operate during a considerable length of time at the highest load.

This invention relates substantially to a process in which the anode voltage of an amplifier tube is controlled with the aid of the signal current in such a manner, that in the greatest part of the working range it will, substantially, increase with the increase of the signal current. The negative grid voltage of this tube also increases with increased signal current, and is controlled in such a manner that the working point of the tube at any moment substantially falls into the central part of the working characteristic at this moment. Said negative grid voltage is impressed to an impedance in the grid circuit of the amplifier tube and is produced by a current varying with the signal intensity (e. g. the anode current or the rectified signal current). In consequence hereof, the anode current will be also altered in the same sense (increases with increased signal current). The signal current used for the control of the anode voltage may be rectified or non-rectified. The first-named arrangement, although it necessitates more apparatus, particularly also a filter in addition to the rectifier, is in general more advantageous, because it enables the effect of any distortions of the higher harmonics to be eliminated. In some cases, indeed, the simpler arrangement may also be convenient; in what follows, however, control by means of rectified signal current will be used in the preponderating majority of cases. In order to prevent any destruction of the tube at permanently high signal currents, it is possible to use relays which will respond at permanently inadmissibly high anode load, and will reduce the anode load. Such an arrangement not only enables the average efficiency of an amplifier tube to be substantially improved, but also renders possible the employment of small amplifier tubes for considerably increased maximum outputs. Amplifier tubes controlled in the manner just described are called in what follows, "controlled tubes."

Arrangements comprising such controlled tubes can be used in high frequency or low frequency amplifiers of any desired type of connection. Particular mention should be made of their employment in the end amplifier stages of transmitters or power amplifiers for the reproduction of sounds and music. By way of examples for explaining the substance of this invention, there will be described in what follows, referring to the Figures 1 to 27 annexed, a few arrangements which so far the control of the grid bias is concerned (Figs. 1–4) differ from each other mainly with regard to this last-named point.

Figure 1:
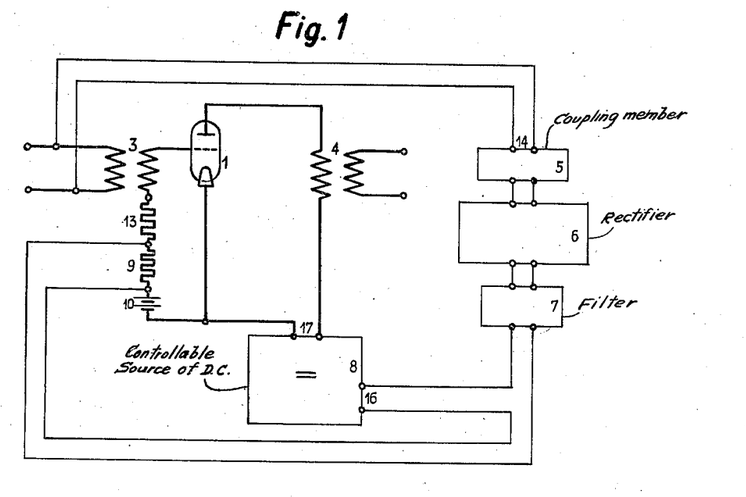
Fig. 1 shows an amplifier stage the grid bias of which is controlled by the rectified signal current.

In Fig. 1 the part 1 is the controlled tube to the grid of which the signal voltage is led through the input transformer 3, while the current is, after having been amplified in the tube, given off through the output transformer 4 as an amplified signal current. A part of the signal current is taken off from the primary side of the transformer 3 and is led through the pair of wires 14, through a coupling member 5, the rectifier 6 and the filter circuit 7 to the grid resistance 9 and to the control member of the controllable source of direct current 8. The source of current 8 supplies through the pair of wires 17 the anode voltage for the tube 1. The grid bias of the tube 1 is the sum of the fixed voltage 10 and of the voltage impressed on the grid resistance 9. Through the resistance 9 the rectified signal current is flowing in such a sense that a negative voltage is impressed upon this resistance.

The source of current 8 is controlled in such a manner that the voltage in the pair of wires 17 will, with increasing signal current, increase substantially in proportion with the signal current over the greatest part of the working range. (See Figs. 13 to 16.) The voltage 10 may be negative, zero or positive, according to the desired figure of the anode current at low signal current.

The tube 1 may be a single-grid or multiple-grid tube heated directly or indirectly by direct current or alternating current. The coupling member 5 may be a simple or a controllable coupling member and may also contain a single amplifier stage or a number of amplifier stages. The rectifier 6 may be a rectifier of any type, as e. g. an electrolytic rectifier, a mercury vapour rectifier or a hot cathode rectifier. If a tube rectifier is employed it may be operated as an anode rectifier or as a grid rectifier, and particularly by rectification by means of the upper or lower bend of its characteristic or in a manner analogous to the way in which audion tubes of radio receiving sets are operated by rectification by means of the grid currents and by means of a suitably dimensioned grid condenser. The filter circuit 7 consists of choke coils, condensers and resistances and causes, on the one hand, a certain amount of delay in the control of the anode voltage and in the control of the grid bias, and on the other hand, locks the circuit of the rectified signal current against any alternating currents which otherwise would in the case of certain arrangements flow into this circuit from the control member of the source of current 8. The voltage 10 is supplied in accordance with Fig. 1 by a battery, but it would also be possible that it should be supplied by a rectifier.

Figure 2:
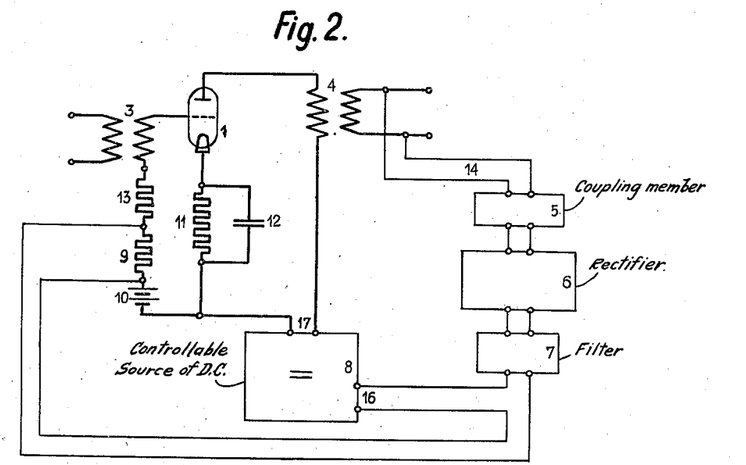
Fig. 2 represents an amplifier stage the grid bias of which is controlled by the anode current of the controlled tube and by the rectified signal current.
Figure 3:
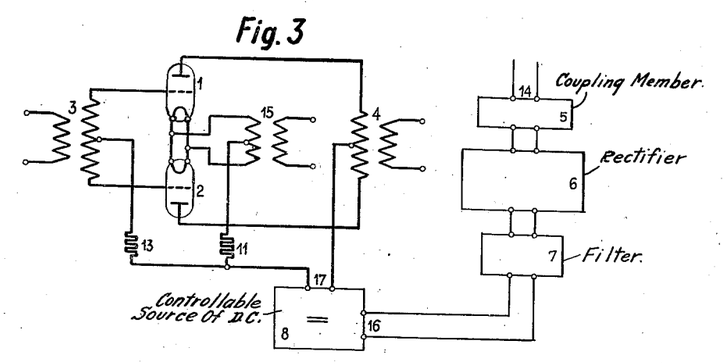
Fig. 3 shows a push-pull amplifier stage.

In Fig. 2 a part of the signal current is taken off from the secondary side of the output transformer 4 and is led in a way similar to that shown on Fig. 1 to the source of current 8 and to the grid resistance 9. Here the resistance 11, bridged over by the condenser 12, is moreover connected in series in the anode circuit of the tube 1, in which resistance 11 a negative voltage is produced by the anode current. In Fig. 3, 1 and 2 are the two tubes of a controlled push-pull stage. The pair of wires 14 may take the signal current from any amplifier stage preceding or following the stage illustrated or from the illustrated stage itself. The rectified signal current is employed exclusively for the control of the source of current 8. The amount of the grid bias of the tubes 1 and 2 is produced in the resistance 11 by the anode current. In this figure the tubes 1 and 2 are heated direct with alternating current through transformer 15, but any other desired form of heating may also be employed.

Figure 4:
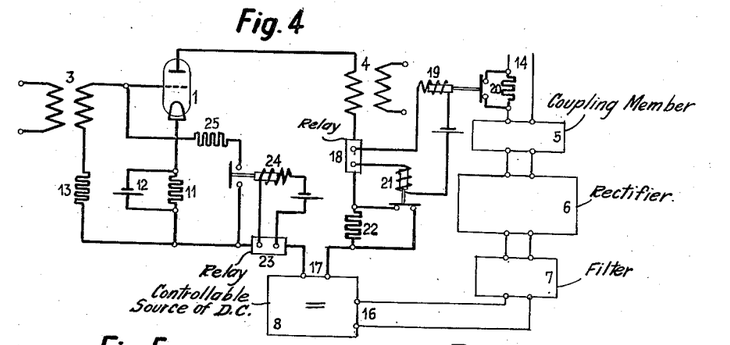
Fig. 4 an amplifier stage, the grid bias of which is controlled by the anode current of the controlled tube.
Figure 5:
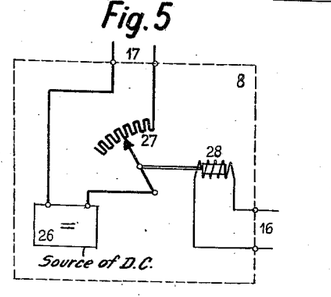
Figs. 5 to 12 illustrate by way of examples for the controlled source of anode voltage of the controlled tube, various sources of voltage amenable to control.

In Fig. 4 it is shown in connection with an example how a controlled tube can be protected by relays against any inadmissible temperature rise. Notably, although the amplifiers are constructed and adjusted in such a manner as to be able to give off the outputs for which they are dimensioned without suffering any excessive temperature rise, it would nevertheless be possible that an excessive temperature rise might occur at any time in consequence of some erroneous control or of some disturbance. For this purpose the anode current of the controlled tube operates two relays which in the case of a permanently high anode current will respond and diminish the signal voltage on the grid of the controlled tube, diminish the rectified signal current and connect a resistance in series with the source of current in the anode circuit of the controlled tube.

The relays 23 and 18 of this arrangement are dependently delayed relays of any known type and respond before the anode of tube 1 has reached any inadmissibly high temperature. The relay 23 is controlled by the anode current and operates an electro-magnet 24 by which a resistance 25 is put in circuit in parallel to the grid circuit of the tube 1, the signal strength and the load of tube 1 being reduced thereby without over-controlling the tube. The relay 18 is likewise controlled by the anode current and connects by means of the electro-magnet 19 a resistance 20 in series with the coupling member 5 and also connects, by means of the electro-magnet 21 a resistance 22 in series with the anode of tube 1. Hereby the rectified signal current and the anode current of the tube 1 are diminished, whereby, however, tube 1 may possibly be overloaded. It would therefore be preferable if the relay 23 responded first, and if the relay 18 responded only in case of the signal voltage being permanently too high. The relays can also be controlled by the rectified signal current or by the signal current itself; it is also possible to use the anode current or the signal current of any amplifier stage for effecting the control. Any number of relays may be employed and any relay may operate a plurality of electro-magnets. Similar resistance may also be connected in parallel to the grid circuits of any other amplifier stages. It is also possible to connect a resistance in series with or parallel to the filter 7 to the pair of wires 16. The electro-magnets may effect changings-over on potentiometers, resistances or stage transformers in the signal circuits of stages preceding the controlled tube. Finally, it is possible to effect any other desired changings-over which in accordance with the substance of this invention effect a reduction of the load of the controlled tube, as, e. g. the putting in circuit of additional resistances, choke coils in front of the controllable resistances, choke coils as shown in what follows in Figs. 5, 6, 7 and 8.

Figure 6:
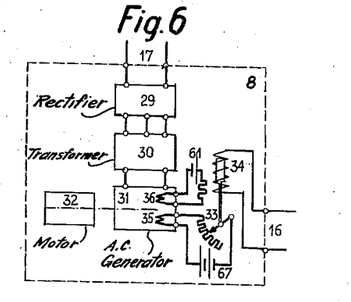

Various possibilities of the control of the source of current 8 are shown on Figs. 5 to 12, the control being effected in such a manner that the rectified signal current flowing in the pair of wires 16 controls, by means of the electro-magnet 28, a resistance 27 connected in series with the battery 26. In Fig. 6 the source of current 8 consists of an alternating current generator 31 driven by the motor 32, and of the transformer 30 and the rectifier 29. The generator 31 possesses two field windings 35 and 36. The winding 36 receives a constant excitation from the source of current 61, whilst the winding 35 receives a controllable excitation from the source of current 67, through a controllable resistance 33. The resistance 33 is controlled by means of the electromagnet 34 by the rectified signal current. The field of the winding 36 is of the same or of the opposite sense as compared to the field of the winding 35, and its magnitude is determined substantially by the desired magnitude of the anode current of tube 1 at low signal currents.

Figure 7:
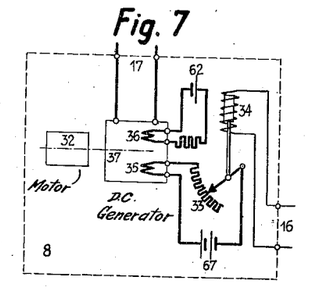

In Fig. 7, the source of current 8 consists of a direct-current dynamo 37 which is driven by the motor 32 and controlled substantially like the generator 31 in Fig. 6.

Figure 8:
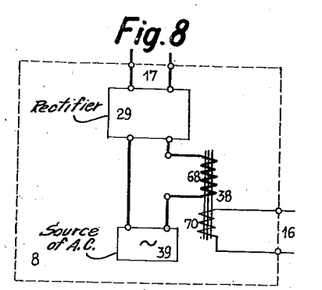

In Fig. 8 the source of current 8 consists of a source of alternating current 39 and of a rectifier 29. In series with the source of current 39 the choking-coil 38 is connected, the inductive resistance of which can be diminished by saturating its iron core. For this purpose an auxiliary winding 79, through which the rectified signal current flows is provided on the choking-coil in addition to the main winding 68.

Figure 9:
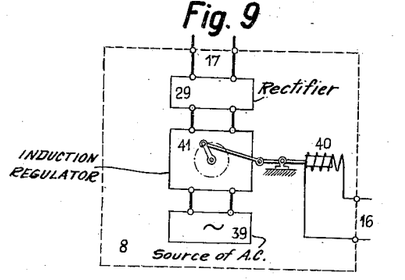

In Fig. 9 the source of current 8 consists of a source of alternating current 39, of a regulating transformer or induction regulator 41 of any desired known type, and of a rectifier 29. The movable part of the regulating transformer or induction regulator is adjusted with the aid of the electromagnet 40 by the rectified signal current.

Figure 10:
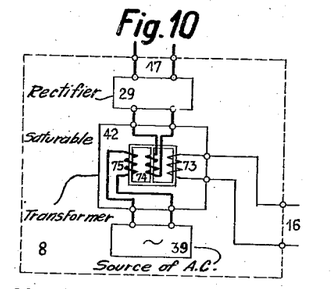

In Fig. 10 the source of current 8 consists of a source of alternating current 39, a special transformer 42 and a rectifier 29. The transformer 42 has three legs. The first leg carries the primary winding 75, the second one the secondary winding 74 and the third one the auxiliary winding 73, through which the rectified signal current flows. If the third leg is saturated by means of direct current, the alternating field will be displaced nearly in its total extent into the second leg, and thereby the voltage in the secondary core 74 will be increased. In the circuit of the winding 73 the filter 7 of the Figs. 1–4 will act as a choke and will prevent any short-circuiting of the transformer by this circuit. The described method of connection of the transformer may also be replaced by any other desired method of connection operating in a similar manner.

Figure 11:
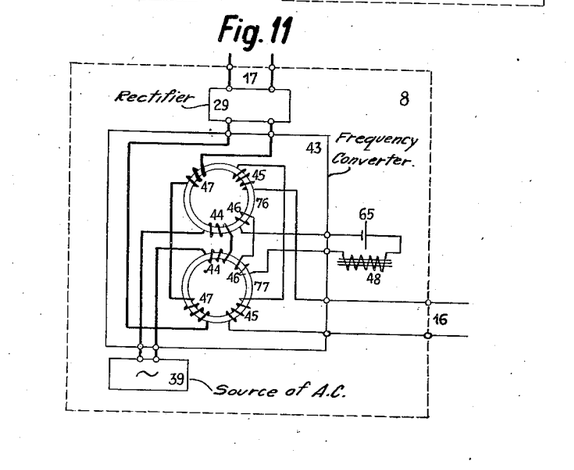

In Fig. 11 the source of current 8 consists of a source of alternating current 39, a static frequency converter 43 and a rectifier 29. The frequency converter 43 consists of two annular iron cores 76 and 77 arranged symmetrically to each other. In each of the iron cores 76 and 77 there is provided a coil of the primary winding 44, a coil of the auxiliary winding 45, a coil of the auxiliary winding 46, and a coil of the secondary winding 47. The coils 44 are connected in series, whereas the coils 47 are connected in series and opposite to each other, so that in case the auxiliary windings 45 and 46 are devoid of current, the whole secondary winding 47 is devoid of any voltage. Through the auxiliary winding 45 there flows the rectified signal current, whereby the iron cores 76 and 77 are saturated and there is set up in the winding 47 a voltage of the second harmonic, which is rectified by the rectifier 29 and led through the pair of wires 17 to the anode circuit of the controlled tube. The second auxiliary winding 46 is fed through a choke 48 by the source of current 65. The choke 48 prevents the winding 46 from acting as a short-circuit. In the circuit of the winding 45 the filter of the Figs. 1–4 acts as a choke. The sense of the field 46 is similar or opposite to that of the field of the winding 45, and its magnitude is determined, substantially, by the desired magnitude of the anode current of the tube 1 at low signal currents. The described connection of the frequency changer may be replaced by any other desired method of connection operating in a substantially similar manner.

Figure 12:
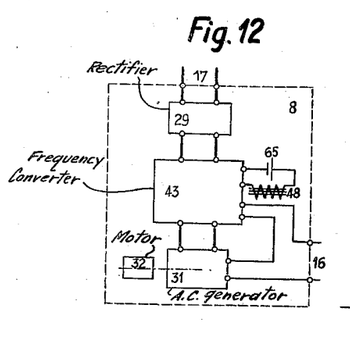

Fig. 12 shows, substantially, a combination of the arrangements according to Figs. 6 and 11. The rectified signal current controls the voltage of the alternating current generator 31 as well as the voltage of the frequency converter 43. In Fig. 12 the field windings of the generator 31 and of the frequency converter 43 are connected in series, but they may also be connected in parallel.

It is also possible to employ any other desired combination of the arrangements according to Figs. 5 to 11.

The mutual relation between the signal currents and anode voltages in the case of the arrangements described above can be seen from Fig. 13 to 16.

Figure 13:
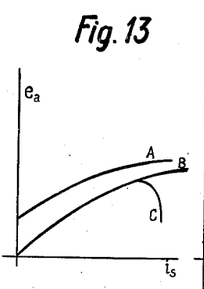
Figs. 13 to 16 represent the way in which the anode voltage of the controlled tube is dependent on the controlling signal current in the case of different arangements.

Fig. 13 contains three curves: A, B and C. Curve A is the typical curve of the anode voltage $e_a$ of the controlled tube 1, as a function of the signal current $i_s$ in the arrangements represented on Figs. 5, 8, 9 and 10. Curve B corresponds to the arrangements according to Figs. 6, 7 and 11, in case the windings 36 or 46 are not fed or are dispensed with altogether. If the chokes provided in the filter circuit 7 are, in the case of an arrangement according to Fig. 11, saturated at high signal currents $i_s$, it is possible that the anode voltage $e_a$ may diminish at high signal currents $i_s$, in accordance with curve C.

Figure 14:
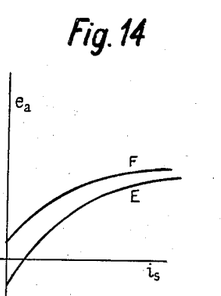

In Fig. 14, curve E represents the conditions in case, in an arrangement according to Fig. 7, the field of the winding 36 is opposite to the field of the winding 35. If the field of the winding 36 is of a direction similar to that of the field of the winding 35, it is curve F that will apply.

Figure 15:
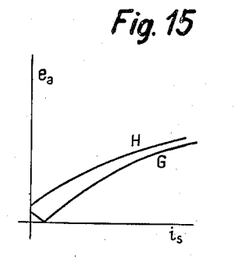

In Fig. 15, curve G corresponds, in the case of an arrangement in accordance with Fig. 6, to the fields of the windings 35 and 36 being mutually opposite, whilst curve H corresponds to these fields being of the same direction. Curves of the type E or G means a raise of threshold sensitivity of the controlled tube and are, for this reason, providing the suppression of accessory noises in periods of time free of any signals.

In the arrangements according to Figs. 6 to 11, windings fitted with iron cores are employed for controlling the voltage. Accordingly, the control curves of the source of current 8 obtained will be of a bent shape.

Figure 16:
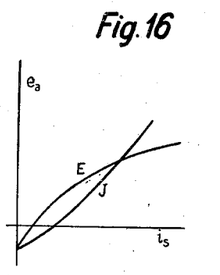
Figure 17:
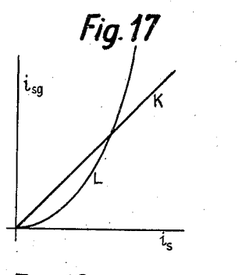
Fig. 17 shows two typical examples for the dependence of the rectified signal current on the signal current flowing from the amplifier through the wires 14.

Figs. 16 and 17 show that a control curve of the anode source of current 8 of bent shape can be compensated by means of a corresponding bent-shaped characteristic of the rectifier 5 so that there exists a linear functional relation between $i_s$ and $e_a$. Fig. 16 shows the variation of the anode voltage $e_a$ as a function of $i_s$, whilst Fig. 17 shows the variation of the rectified signal current $i_{sg}$ as a function of $i_s$, i. e. it shows the characteristic of the rectifier 5. In connection herewith there corresponds to the bent-shaped curve E of Fig. 16 the linear rectifier characteristic represented by curve K of Fig. 17, and to the practically linear curve J of Fig. 16 the bent-shaped rectifier characteristic represented by curve L of Fig. 17. It is supposed, that with a linear rectifier characteristic according to curve K the control curve of 8 is such that $e_a$ is represented as a function of $i_s$ as in Fig. 14 by the curve E. If now the characteristic of the rectifier 5 is altered in accordance with the curve L, the voltage $e_a$ will, as long as the old source of current 8 is maintained, vary as a function of $i_s$ in accordance with the curve J, i. e. in a practically linear manner. If by way of rectifier 6 a grid rectifier is employed, rectifying being effected by means of the lower bend of the strongly bent characteristic of the rectifier tube, there will be obtained a curve of the type L. Such a curve can particularly be obtained by employing variable mu tube as a rectifier tube.

Figures 18, 19:
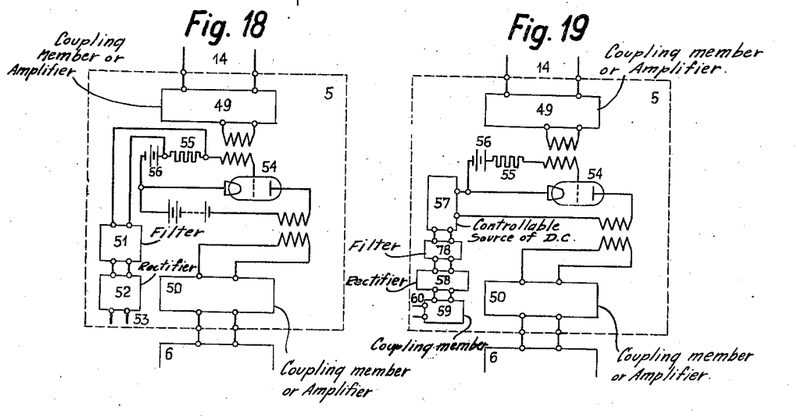
Figs. 18 and 19 represent each a part of a controlled amplifier stage in which such part of the signal current as is employed for the purposes of control, is amplified before rectifying, by means of a variable mu tube with controlled grid bias (Fig. 18) or by means of a variable mu tube with controlled anode voltage (Fig. 19); finally, Figs. 20 to 27 serve to make the employment of the process according to the invention in case the signals to be amplified consist of modulated carrying waves, more readily understood.

Another method for obtaining a curve of the type L consists in employing in the coupling member 5 at least one amplifier stage comprising a variable mu tube. In connection herewith, two typical methods of connection, mutually different in principle, are possible for this amplifier stage; these two kinds of connection are shown on Figs. 18 and 19. In Fig. 18 the coupling member 5 contains a coupling member or amplifier 49, an amplifier stage comprising a variable mu tube 54 and a further coupling member or amplifier 50 the output of which is connected with the input of the rectifier 6. The coupling members 49 and 50 may also be dispensed with entirely or in part. The tube 54 operates with substantially constant anode voltage, which is supplied by a battery but might be supplied just as well by any other suitable source of current. The grid bias on the tube 54 is controlled in such a manner that the working point is transferred in the case of greater signal currents into steeper portions of its working characteristic. Through the wires 53 the controlling signal current is admitted to the rectifier 52, rectified, and a positive voltage is impressed on the grid resistance 55 through the filter 51. The battery 56 imparts a bias to the grid of the tube 54, the magnitude of the said bias being chosen so as to correspond, for a certain controlling signal voltage, to the desired magnitude of the rectified signal current in the pair of wires 16. Instead of the battery 56, another source of voltage may also be employed. The wires 53 may be joined on any amplifier stage of the whole system. They may also be joined on at the output of the rectifier 6 or of the filter 7, in which case the rectifier 52 or also the filter 51 may be dispensed with.

According to Fig. 19, the variable mu tube 54 operates at constant grid bias 56, its anode voltage being at the same time controlled in such a manner as to become increased at greater controlling signal currents, whereby the working point of the tube will be transferred in the case of greater signal currents into steeper portions of its instantaneous working characteristic. The anode voltage of the tube 54 is controlled in a manner analogous to that in which the anode voltage of the tube 1 is controlled. Through the pair of wires 60 the controlling signal current is taken from any place of the whole system, admitted through the coupling member 59 to the rectifier 58, rectified, and flow across the filter 78 to the control member of the controllable source of current 57. The source of current 57 may be of any of the types described for the source of current 8. The pair of wires 60 may, however, also be joined on to the source of current 8 in Figs. 1 to 4, in which case the rectifier 58, the filter 78 and the source of current 57 may be dispensed with entirely or in part.

The process described above can, however, be employed for high or low frequency amplifiers in those cases only where the signals to be amplified are of variable intensity or cease entirely from time to time. In those cases however, in which the signals to be amplified consist of a modulated carrier wave of known shape, these methods will fail, as the mean value of such a modulated carrier wave remains substantially constant over a period of the signal to be modulated.

In order to remove this drawback there is stated in what follows a method for a kind of modulation of carrier waves and for the control of the anode dissipation of carrier wave amplifiers, in which method the intensity of the carrier wave is, for the purpose of the modulation of a carrier wave, controlled in such a manner, that this increases with greater amplitudes of the modulating signal current. Particularly, the ideal case towards which endeavours should be directed, is that the amplitude of the carrier wave should always be of the same magnitude as the instantaneous value of the modulating signal current, which means, in other words: a 100% modulation with any desired intensities of signals.

The method to be employed in this connection consists substantially in the employment of a further special amplifier stage with controlled ratio of transmission, in which the carrier wave not yet modulated is amplified. This special amplifier stage contains a tube with variable mu characteristic, on the grid of which the voltage of the carrier wave is impressed in invariable magnitude, and the negative grid voltage of which is controlled by the rectified modulating signal current in such a manner that its absolute figure decreases with greater figures of the signal current. Thereby the ratio of transmission of this special amplifier stage becomes all the greater, the greater the mean value of the modulating signal current. The intensity of the carrier wave amplified by this special amplifier stage varies with the magnitude of the rectified modulating signal current, the variation being, in the ideal case, proportional to the latter. Any other suitable arrangement may also be employed as a special amplifier stage.

The carrier wave which has already been amplified by this special amplifier, may be modulated in any desired kind of modulator, in connection wherewith the modulation will in the ideal case always be a 100% one independently of the signal strength, as the intensity of the carrier wave admitted to the modulator has already been adapted to the mean value of the signal current to be modulated.

By employing this process, the mean value of the modulated carrier wave over a period of the modulating signal will no longer be constant and will attain its maximum value during short periods, during the time of the load peaks only, whereby the carrier wave modulated according to this last-named process will be suitable for amplification in a stage with controlled anode losses according to the method discussed precedingly.

The methods to be described in what follows for the control of the anode dissipation of the amplifier stage in which the modulated carrier wave is amplified, consists substantially of methods for the control of the voltage of the source of anode current of this stage, it being possible, in connection herewith, to employ for the control, as a control current, either the rectified modulating signal current, or the rectified, modulated carrier wave already containing the signal. In order to carry the control into effect it is possible to use the arrangement described in the present invention, comprising a grid-controlled rectifier tube, or any other known arrangements.

By way of example for explaining in greater detail the essential features of the last-named method there will be discussed in what follows a few further figures in which the employment of this method is shown in a diagrammatical manner.

Figure 20:
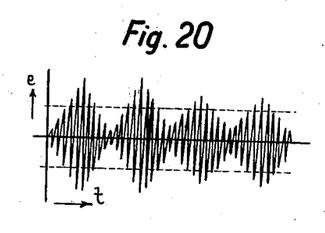
Figure 21:
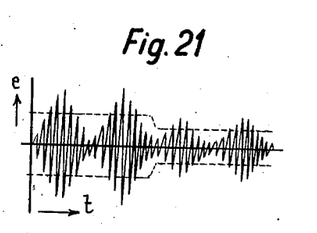

Fig. 20 shows the variation in time of a modulated carrier wave of known shape, in the case of 100% and in the case of 50% modulation, whilst Fig. 21 shows the variation in time of a carrier wave modulated according to the latter method, with the same intensity of the modulating signal voltage. In connection herewith $t$ denotes time and $e$ the value at any time being of the voltage of the modulated carrier wave. The main value of $e$ depends on the main value of the modulating signal.

Figure 22:
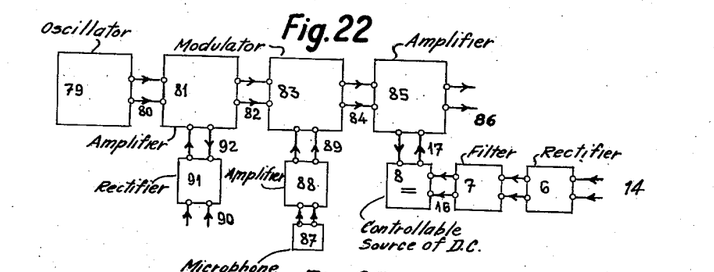

Fig. 22 shows, in a diagrammatical manner, an amplifier system for carrying the method now discussed into effect. The carrier wave is produced in the oscillator 79, amplified in the carrier wave amplifier 81, modulated in the modulator 83; the modulated carrier wave is amplified in the amplifier 85 which is an amplifier of the types illustrated in Figs. 1 to 4, or of some other equivalent type, and is led through the wires 86 to an output receiving device (aerial, transmission line, etc.). The modulating signal is produced in the sender or microphone 87, amplified in the amplifier 88 and led through the wires 89 to the modulator 83. A part of the signal current or of the modulated carrier wave is taken off from some point of the amplified system, led through the wires 90 to the rectifier 91 and rectified; it is with this rectified current that the ratio of transmission of the amplifier 81 is controlled, as explained in greater detail in Fig. 23. 80, 82, 84, 89, 92 and 17 denote the wires by which the various members are connected. The anode voltage of the amplifier 85 is, as before, supplied by the controllable source of current 8. For the purpose of automatically regulating the source of current 8 a part of the modulating signal current or of the modulated carrier wave is taken off through the wires 14 from some suitable point of the amplifier system and is, after optional rectification in the rectifier 6 and smoothing in the filter circuit 7 admitted to the control member of the source of current 8.

Figure 23:
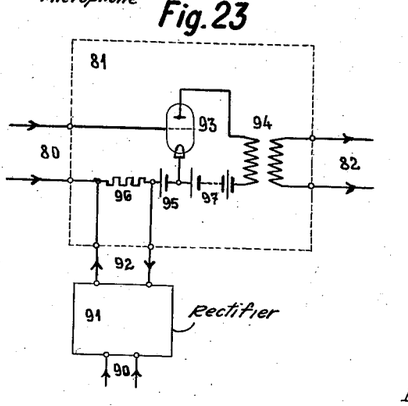

Fig. 23 illustrates a known type of arrangement, by way of example, for the amplifier 81. The voltage of the carrier wave is impressed with constant strength to the grid of the tube 93, amplified and admitted through the output transformer 94 and over the wires 82 to the modulator 83. The tube 93 has a variable mu characteristic but it may be a direct-heated or indirectly heated single-grid or multiple-grid tube of any desired design. The battery 95 imparts to the grid of the tube 93 a negative voltage, whereby the working point is transferred to a place of less steep gradient.

By means of the wires 90 a part of the modulating signal current or of the modulated carrier wave is taken off from some suitable point of the whole amplifier system, rectified in the rectifier 91 and led over the wires 92 to the grid resistance 96 in such a sense that the voltage drop produced in the resistance 96 should be opposite to the voltage of the battery 95. Hereby the absolute figure of the negative grid voltage will become so much less and accordingly the ratio of transmission of the tube 93 will become so much greater, the greater the figure of the rectified signal current. The grid voltage battery 95 and the anode battery 97 may be replaced by suitable sources of current of any desired type. Instead of the arrangement according to Fig. 23 it is possible to employ any other arrangement suitable for the control of the ratio of transmission; thus there may also be employed arrangements by means of which the anode voltage of the tube 93 is varied.

Figure 24:
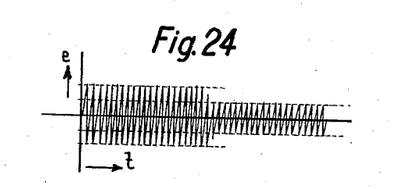

Fig. 24 shows the variation in time of a carrier wave amplified by the amplifier 81, notably at the same relative modulating signal strength, as in the case of Figs. 20 and 21. The amplitudes of the amplified carrier wave depend on the mean value of the modulating signal current; the ideal case is that where this dependence is linear.

Figures 25, 26:
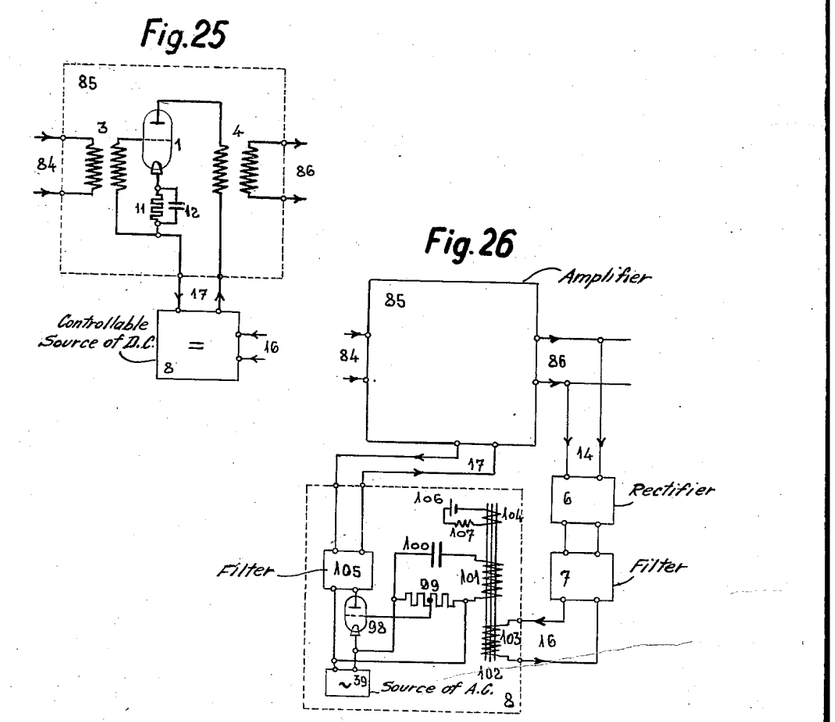

Fig. 25 represents an example of the amplifier 85 resembling the arrangement according to Fig. 2 very much. The wires 84 are leading the voltage of the modulated carrier wave through the input transformer 3 to the grid of the amplifier tube 1. The amplified modulated carrier wave is led through the output transformer 4 to the output receiving device aerial, or transmission line. The anode voltage of the tube 1 is supplied by the controllable source of current 8. The wires 16 are leading to the source of current 8, as its control current, either the rectified modulating signal current, or the rectified modulated carrier wave. The negative grid voltage is produced in the resistance 11 by the anode current and therefore becomes more negative with higher anode voltage. The resistance 11 is, for the alternating current component of the anode current, bridged over by the condenser 12. The source of current 8 may, as precedingly, be any kind of source of current the voltage of which is amenable to control by means of current.

Figure 27:
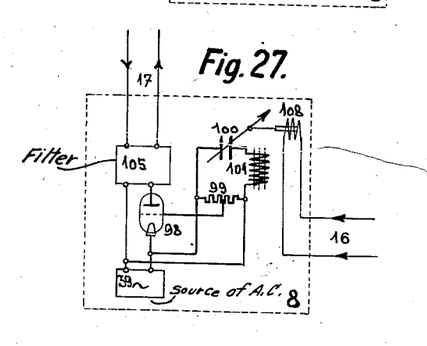

Figs. 26 and 27 represent two special forms of the source of current 8 for these last-discussed arrangements.

Fig. 26 contains, as a source of current 8, an arrangement comprising a grid-controlled rectifier tube 98. The source of alternating current 39 feeds on the one hand the anode circuit of the rectifier tube, and, on the other hand, it feeds the alternating current bridge consisting of the impedance 99, the condenser 100 and the choking-coil 101. One point of the impedance 99 is connected with the grid of the tube 98, whereby an alternating current voltage is impressed to this grid, which voltage is displaced in phase relatively to the terminal voltage of the source of alternating current 39. The choking-coil 101 is mounted on an iron core 102 which carries two further windings 103 and 104. By means of the wires 14 a part of the modulated carrier wave is taken off from the starting circuit of the amplifier 85, rectified in the rectifier 6 and led, over the filter circuit 7 and the wires 16 to the winding 103, whereby the iron core 102 is saturated and the inductive resistance of the choking-coil 101 is altered. The alteration of the resistance of the coil 101 effects a change of phase of the grid voltage of the tube 98 and thereby an alteration of the effective figure of the rectified voltage. The rectified voltage is smoothed by the chain of filters 105 and led through the wires 17 to the anode circuit of the amplifier tube 1 in Fig. 25. The winding 104 of the iron core 102 is fed from the battery 106 whereby the rest magnitude of the choking-coil 101 is adjusted. The choke 107 in the circuit of the winding 104 prevents the latter from acting as a short-circuit winding.

Fig. 27 represents an arrangement resembling the one shown on Fig. 26, in which, however, not the choke 101 of the bridge, but the condenser 100 is amenable to control. For the control of this condenser there is employed the electromagnet 108 which is excited over the wires 16 by the rectified modulating signal current or by the rectified modulated carrier wave.

The arrangements described may, by suitably selecting the control equipment of the source of direct current 8 also be controlled, in accordance with what has been said in the introductory part, by means of non-rectified signal current.

Thus for instance the controlling electro-magnets shown on Figs. 5, 6, 7 and 9 can also be energized by means of alternating current, i. e. also by means of the non-rectified signal current. Similarly, the sources of direct-current of the arrangements as per Figs. 22 to 27 can, in an analogous manner, also be imagined to be arranged for being controlled by means of the non-rectified modulating signal current.

What I claim as new and desire to secure by Letters Patent of the United States is:

1. A process for increasing the maximum alternating current output of electron tubes, consisting in controlling the anode voltage of an amplifier tube by means of at least a certain part of the signal current in such a manner that in the greatest part of the working range of the tube the anode voltage and the anode current are increased substantially proportionally to the signal current intensity, and that an additional negative voltage is impressed to the grid of the controlled tube, the absolute value of which voltage increases with the anode voltage and is of such magnitude that for all anode voltages the working point of the tube falls into the steepest part of its working characteristic, the variation of the anode dissipation being greater than the variation of the control power consumed by the control process.

2. A process for increasing the maximum alternating current output of electron tubes, consisting in controlling the anode voltage of an amplifier tube by means of at least a certain part of the signal current in such a manner that in the greatest part of the working range of the tube the anode voltage and the anode current are increased substantially proportionally to the signal current intensity, and that an additional negative voltage produced by the anode current of the controlled tube is impressed to the grid of the controlled tube, the absolute value of which voltage increases with the anode voltage and is of such magnitude that for all anode voltages the working point of the tube falls into the steepest part of its working characteristic, the variation of the anode dissipation being greater than the variation of the control power consumed by the control process.

3. A process for increasing the maximum alternating current output of electron tubes, consisting in controlling the anode voltage of an amplifier tube by means of at least a certain part of the signal current in such a manner that in the greatest part of the working range of the tube the anode voltage and the anode current are increased substantially proportionally to the signal current intensity, and that an additional negative voltage composed of a constant voltage, of a voltage produced by the anode current and a voltage produced by the rectified signal current is impressed to the grid of the controlled tube, the absolute value of which voltage increases with the anode voltage and is of such magnitude that for all anode voltages the working point of the tube falls into the steepest part of its working characteristic, the variation of the anode dissipation being greater than the variation of the control power consumed by the control process.

NICHOLAS HIRSCH.